United States Patent [19]
Dixon et al.

[11] 3,927,170
[45] Dec. 16, 1975

[54] HYDROMETALLURGICAL RECOVERY OF COPPER NICKEL OR ZINC FROM SULPHIDE ORES BY OXIDATION IN AMMONIACAL CHLORIDE OR NITRATE SOLUTIONS

[75] Inventors: Percy Dixon, Glen Osmond; David C. Madigan, Blackwood, both of Australia

[73] Assignee: Charles Harold Warman, New So. Wales, Australia

[22] Filed: Dec. 17, 1973

[21] Appl. No.: 425,062

[30] Foreign Application Priority Data
Dec. 18, 1972 Australia.............................. 1663/72
Apr. 10, 1973 Australia.............................. 2954/73

[52] U.S. Cl. ................. 423/33; 423/109; 423/150; 423/571; 75/103
[51] Int. Cl.² ...................... C01G 3/14; C01G 9/00; C01G 53/12; C01B 17/02
[58] Field of Search ........... 423/32, 33, 27, 28, 571, 423/566, 567, 109, 150; 75/103, 117, 101 R

[56] References Cited
UNITED STATES PATENTS

| | | | |
|---|---|---|---|
| 755,302 | 3/1904 | LeSeur.................................. | 75/117 |
| 2,145,817 | 1/1939 | Stoops .................................. | 75/103 |
| 2,785,059 | 3/1957 | McDonald ...................... | 423/567 X |
| 2,822,263 | 2/1958 | Forward............................... | 75/117 |
| 3,804,614 | 4/1974 | Coffield et al..................... | 423/32 X |

*Primary Examiner*—O. R. Vertiz
*Assistant Examiner*—Brian E. Hearn
*Attorney, Agent, or Firm*—Kinzer, Plyer, Dorn & McEachran

[57] ABSTRACT

A process for the ammoniacal leaching of sulphide ores or concentrates to recover metals therefrom to form soluble complex, amines, the process including the step of treating the materials suspended in ammoniacal solutions with air or oxygen at or near atmospheric pressure and at or near ordinary atmospheric temperatures.

2 Claims, No Drawings

HYDROMETALLURGICAL RECOVERY OF COPPER NICKEL OR ZINC FROM SULPHIDE ORES BY OXIDATION IN AMMONIACAL CHLORIDE OR NITRATE SOLUTIONS

This invention relates to ammoniacal leaching processes for treating sulphide ores or concentrates for the purpose of recovering therefrom metals known to form soluble complex amines and separating the said metals from the iron, sulphur, and other components of the ores or concentrates or the like.

It is well known that many sulphide ores or concentrates notably those of copper, nickel and cobalt may be treated with air or oxygen in ammoniacal solutions at elevated temperatures and pressures whereby the said metals dissolve as complex amines and the sulphide sulphur is oxidised to soluble oxy anions such as thiosulphate, polythionates, sulphamate or sulphate depending on the conditions employed.

In the past such processes have suffered from two principal disadvantages.

In the first place satisfactory rates of reaction have been achieved only by operating the said processes at elevated temperatures near or above 100°C and at high partial pressures of oxygen, in some instances as high as 200 psig, thus necessitating the use of pressure vessels able to withstand the high pressures and temperatures involved.

A second disadvantage of such proceses is that substantially all the sulphur in the metal sulphide is oxidised to a soluble form thereby converting a significant proportion of the ammonia into ammonium salts of the soluble sulphur. It is usual in such processes to carry them out in such a way as to ensure the complete oxidation of the soluble sulphur to sulphate and after recovering the soluble metal values, the leach solutions are then treated for the recovery of ammonium sulphate. If no ready market exists for the by-product ammonium sulphate the ammonia has to be recovered from the barren leach solutions for re-use in the leaching stage by reacting the barren leach solutions with lime and distilling the liberated ammonia.

THE SUMMARY OF THE INVENTION

Contrary to the generally held belief as supported by descriptions in the literature of the above hydrometallurgical processes, that high partial pressures of oxygen and elevated temperatures are required to effect the oxidation of sulphide minerals in ammonia solutions, we have found that satisfactory rates of reaction can be achieved in ammoniacal solutions at or near ordinary atmospheric temperatures and using air or oxygen at or near ordinary atmospheric pressure.

Moreover, we have established, that in ammoniacal solutions under certain conditions of ammonium salt concentration and pH values, the amount of sulphide sulphur in the ore or concentrate that is oxidised to a soluble form can be substantially reduced and that a significant proportion of the said sulphide sulphur can be converted to elemental sulphur.

We have further established that the rate of reaction can be substantially improved by the presence of ammonium chloride or ammonium nitrate in the ammoniacal leaching solutions.

The present invention therefore relates to a process for recovering metal values from sulphide ores or concentrates by treatment of the said materials suspended in ammoniacal solutions with air or oxygen at or near atmospheric pressure and at or near ordinary atmospheric temperatures. The invention is further and more particularly defined by carrying out the oxidation reaction in the presence of an ammonium salt the ammonium ion concentration of which should preferably be greater than 1.5 molar and at pH values higher than pH 8 and preferably in the range of pH 9.5 to pH 11.5 and also under these said conditions but where the said ammonium salt is either ammonium chloride or ammonium nitrate to promote the rate of reaction.

DESCRIPTION OF THE PREFERRED EMBODIMENT

The following results are presented in support of the invention but it is to be understood that the invention is not restricted to the specific ores or concentrates employed and that these are mentioned for the purpose of example only.

A sample of chalcopyrite containing 29.5% Cu, 29.8% Fe and 32.8% S was ground to give approximately the following particle size distribution:

| | |
|---|---|
| −10 μm | 50% |
| 10 − 30 μm | 30% |
| 30 − 50 μm | 10% |
| +50 μm | 10% |

The top size was 70 μm.

1 g of the ground material was suspended in 75 ml of leach liquor the composition of which is shown in the following tables.

The pH of the leach liquor was adjusted with ammonia to the value shown in the tables.

The suspension was contained in a cylindrical glass vessel fitted with a fritted-glass gas diffuser through which oxygen was passed at a controlled rate. During gassing the suspension was magnetically stirred with a stirring bar and the reaction vessel was held at a controlled temperature in a water bath.

Table 1

Effect of Ammonium Salt Concentration on Solubility of Sulphur
Leaching time: 3 hours. Temperature: 30°C

| Composition of Leach Liquor | pH | % Cu Extracted | Molar Ratio S:Cu Extracted |
|---|---|---|---|
| NH₄OH | 12.5 | 42.5 | 1.79 |
| 1.0 M NH₄Cl | 10.0 | 55.1 | 1.68 |
| 1.5 M do. | 10.0 | 50.4 | 0.94 |
| 2.0 M do. | 10.0 | 48.0 | 0.64 |
| 3.0 M do. | 10.0 | 52.0 | 0.59 |
| 5.0 M do. | 10.0 | 52.4 | 0.40 |

Table 2

Effect of pH on Solubility of Sulphur
Leaching Time: 3 hours. Temperature: 30°C.

| Composition of Leach Liquor | pH | % Cu Extracted | Molar Ratio S:Cu Extracted |
|---|---|---|---|
| 3.0 M NH₄Cl | 8.5 | 18.5 | 1.12 |
| do. | 9.0 | 38.8 | 1.07 |
| do. | 9.5 | 43.5 | 0.67 |
| do. | 10.0 | 52.0 | 0.59 |
| do. | 10.5 | 58.2 | 0.44 |
| 5.0 M NH₄Cl | 8.5 | 28.0 | 0.79 |
| do. | 9.0 | 35.7 | 0.67 |
| do. | 9.5 | 44.2 | 0.45 |
| do. | 10.0 | 52.4 | 0.40 |

Table 3

Effect of Type of Ammonium Salt
on Extraction Rate of Copper.
Leaching Time: 3 hours. Temperature: 30°C
Concentration of Ammonium Ion: 5 Molar.

| Ammonium Salt | pH | % Cu Extracted |
|---|---|---|
| $(NH_4)_2SO_4$ | 10.0 | 39.8 |
| $NH_4COOCH_3$ | 10.0 | 36.1 |
| $(NH_4)_2CO_3$ | 10.0 | 28.7 |
| $NH_4Cl$ | 10.0 | 52.4 |
| $NH_4NO_3$ | 10.0 | 55.0 | the above results clearly demonstrate that:
a. increasing the ammonium salt concentration of the leach liquor significantly reduces the amount of sulphur extracted;
b. at a fixed concentration of ammonium salt in the leach liquor, increasing pH values likewise significantly reduce the amount of sulphur extracted;
c. both ammonium chloride and ammonium nitrate are superior to other ammonium salts in terms of the rate of extraction of copper.

These results then permit the selection of conditions for the ammoniacal leaching of metal sulphide ores or concentrates which significantly improve the rate of leaching the metal and at the same time significantly reduce the amount of sulphur dissolved in the leach liquor. The latter effect is of considerable economic importance in that less oxygen is consumed in the leaching process because less sulphur is oxidised to a soluble form and less lime is consequently required for reacting with the ammonium salts of the soluble sulphur so as to recover the ammonia for recycling to the leaching process.

The following examples are presented in further support of the invention to indicate its application to other metal sulphide ores or concentrates and in addition to show the results which can be achieved in treating a copper sulphide concentrate under conditions more closely approaching those which would be employed in an operating process.

EXAMPLE 1. TREATMENT OF A NICKEL SULPHIDE CONCENTRATE

A sample of nickel sulphide flotation concentrate containing 9.10% Ni and 24.2% S was ground to minus 75 μm.

1.0 gram of the ground sample was suspended in 75 ml of ammonium chloride solution adjusted to pH 10.0 with ammonia, the final concentration of ammonium chloride being 3.0 molar. The suspension was contained in a cylindrical glass vessel fitted with a fritted-glass gas diffuser through which oxygen was passed at a controlled rate for 3 hours during which time the suspension was stirred with a magnetic stirring bar and maintained at 30°C by holding the vessel in a water bath. At the end of the reaction period 58.5% of the nickel and 25.1% of the sulphur in the sample had been extracted into the ammoniacal solution. 10.0% of the total sulphur in the sample was converted into elemental sulphur and was extracted from the leached residue with carbon bisulphide.

EXAMPLE 2. TREATMENT OF A ZINC SULPHIDE SAMPLE.

A 1.0 gram sample of marmatite containing 51.2% Zn and 20.5% S was treated in exactly the same manner as that described above for the nickel sulphide concentrate. At the end of the 3-hour reaction period 12.6% of the zinc and 2.7% of the sulphur in the sample had been extracted into the ammoniacal solution. 13.2% of the total sulphur in the sample was converted into elemental sulphur.

EXAMPLE 3. TREATMENT OF A COPPER SULPHIDE CONCENTRATE.

A sample of a copper flotation concentrate containing 22.0% Cu and 31.0% S and in which the predominant copper mineral was chalcopyrite, was dry-ground in a Sieb mill to give a product having the following particle sizing:

| Size, μm | % Undersize |
|---|---|
| 50 | 80 |
| 25 | 69 |
| 20 | 65 |
| 15 | 58 |
| 10 | 50 |
| 5 | 35 |
| 2 | 14 |

40 g of this product were placed in a jacketed stainless steel reaction vessel with 160 g of an ammoniated aqueous solution of ammonium chloride having a pH value of 10.0 and an ammonium chloride concentration of 4.0 moles per liter. The head space in the vessel was purged of air by passing a stream of oxygen. The vessel was then sealed, the stirrer was started, and oxygen was passed in to maintain a total pressure in the vessel of approximately 9 kPa. Oxidation was continued for 3 hours, during which time the stirrer was rotated at 2,500 rpm and the temperature of the reaction mixture was maintained at 30°C by circulation through the jacket of water at that temperature. At the end of the reaction time the slurry was filtered and the solid and liquid products were assayed for copper and sulphur. The results were;

| | | |
|---|---|---|
| Liquor: | Copper (Cu) | 45.9 g/l |
| | Sulphur (S) | 27.8 g/l |
| Extraction: | Copper | 83.4% |
| | Sulphur | 35.9% |
| Mole Ratio S:Cu in solution. | 1.20 | |

EXAMPLE 4. TREATMENT OF A COPPER SULPHIDE CONCENTRATE.

50g of the ground sample described in Example 3 were placed in the reaction vessel with 200 g of an ammoniated aqueous solution of ammonium nitrate having a pH value of 10.5 and a salt concentration of 4.0 M. The slurry was oxidised as described in Example 3, namely for 3 hours at an oxygen pressure of approximately 9 kPa, at 30°C and with a stirrer speed of 2500 rpm. The results were:

| | | |
|---|---|---|
| Liquor: | Copper (Cu) | 45.0 g/l |
| | Sulphur (S) | 23.5 g/l |
| Extraction: | Copper | 81.8% |
| | Sulphur | 30.3% |
| Mole Ratio S:Cu in solution. | 1.04 | |

EXAMPLE 5. TREATMENT OF A COPPER SULPHIDE CONCENTRATE.

50 g of the ground sample described in Example 3 were placed in the reaction vessel described with 200 g of an ammoniated aqueous solution of ammonium chloride having a pH value of 10.0 and a salt concentration of 4.0 M. The slurry was oxidised under the same conditions as in Example 3, except that the reaction time was only 2 instead of 3 hours. The results were:

| Liquor: | Copper (Cu) | 41.5 g/l |
| --- | --- | --- |
|  | Sulphur(S) | 21.6 g/l |
| Extraction: | Copper | 75.4% |
|  | Sulphur | 17.8% |
| Mole Ratio S:Cu in solution | 1.03 | |

EXAMPLE 6. TREATMENT OF A COPPER SULPHIDE CONCENTRATE.

The experiment described in Example 5 was repeated with this difference only, that the reaction time was reduced from 2 hours to 1. The results were:

| Liquor: | Copper (Cu) | 31.8 g/l |
| --- | --- | --- |
|  | Sulphur (S) | 11.8 g/l |
| Extraction: | Copper | 57.8% |
|  | Sulphur | 15.2% |
| Mole Ratio S:Cu in solution. | 0.74 | |

EXAMPLE 7. TREATMENT OF A COPPER SULPHIDE CONCENTRATE.

50 g of the ground sample described in Example 3 were placed in the reaction vessel with 200 g of an aqueous solution of ammonia having a pH value of 12.3. The mixture was reacted with oxygen for 3 hours under the conditions described in Example 3. The results were:

| Liquor: | Copper (Cu) | 18.0 g/l |
| --- | --- | --- |
|  | Sulphur (S) | 17.0 g/l |
| Extraction: | Copper | 32.7% |
|  | Sulphur | 21.9% |
| Mole Ratio S:Cu in solution. | 1.87 | |

The invention can now be more completely described as follows:

Metal Sulphide ores or concentrates can be treated by suspending the ore or concentrate in an ammoniacal solution and passing air or oxygen through the suspension at or near ordinary atmospheric temperatures. The rate of extraction of the metal is increased by using oxygen instead of air, by the presence of ammonium chloride or ammonium nitrate in the ammoniacal solution and by finer grinding of the concentrates. If an aqueous solution of ammonia alone is used as the leach liquor, sulphide sulphur is oxidised to a soluble oxy anion of sulphur and no elemental sulphur is produced. However, in the presence of an ammonium salt such as ammonium chloride in addition to ammonia, part of the sulphide sulphur is oxidised to elemental sulphur and remains in the leached residue, from which it can be obtained by various methods, such as solvent extraction or flotation or melting. The proportion of sulphur obtained in the elemental form increases with the ammonium salt concentration. The ratio of soluble sulphur to metal in the leach liquor may be decreased both by increasing the ammonium salt concentration of the leach liquor and by increasing the pH. To obtain a substantial proportion of the reacted sulphide sulphur as elemental sulphur it is necessary to increase the ammonium ion concentration above about 1.5 molar, and the pH of the leach system above about 9.5. For example by this means it is possible to obtain a molar ratio of sulphur to copper in a leach liquor from chalcopyrite as low as or lower than 0.5, whereas in the previously reported ammoniacal leaching processes for copper ores, substantially all of the sulphide sulphur in the ore or concentrate is converted to sulphate, giving a S:Cu molar ratio of 2 for chalcopyrite.

The ratio of metal to S in the leach liquor, and the proportion of elemental sulphur remaining in the leached residue, are increased both by increasing the ammonium ion concentration of the leach liquor, and by increasing the pH.

Elemental sulphur may be recovered from the solid residue after leaching the ore or concentrate by drying the residue and extracting the sulphur with an organic solvent such as tetrachlorethylene. Alternatively, to facilitate the recovery of elemental sulphur a suitable volume of a known solvent for sulphur may be added to the pulp containing the ore or concentrate before treatment with air or oxygen. In this way elemental sulphur produced during oxidation of the sulphide ore or concentrate is immediately dissolved in the solvent. After the desired reaction period the leach solution containing the metal and the solvent containing the sulphur are separated from the solid residue. The leach liquor and the solvent can then be separated by known methods, the aqueous phase being treated by known methods for recovery of the dissolved metal values and the organic phase separately treated by known methods for recovery of sulphur.

We claim:

1. A process for recovering from a sulfide ore or concentrate a metal selected from the group consisting of copper, nickel and zinc consisting essentially of passing oxygen through a suspension of the sulfide contained in aqueous ammonium chloride or ammonium nitrate of at least 1.5 molar concentration at or near atmospheric pressure and at or near ordinary atmospheric temperatures, the suspension having a pH at least 9.5.

2. A process according to claim 1 carried out in the presence of a water immiscible solvent in which elemental sulfur is soluble.

* * * * *